United States Patent [19]
Patrisso et al.

[11] Patent Number: 5,930,908
[45] Date of Patent: Aug. 3, 1999

[54] ALIGNMENT TOOL FOR PHASING OF SPLINED SLIP JOINT DRIVESHAFT COMPONENTS

[75] Inventors: Jeffrey Paul Patrisso; Albert Aiken; David W. Maxwell, all of Toledo, Ohio

[73] Assignee: Dana Corporation, Toledo, Ohio

[21] Appl. No.: 08/915,959

[22] Filed: Aug. 21, 1997

[51] Int. Cl.$^6$ ........................................................ G01B 5/24
[52] U.S. Cl. ................................. 33/600; 33/603; 33/1 N; 33/645
[58] Field of Search ............................. 33/533, 600, 603, 33/606, 613, 645, 1 N, 534

[56] References Cited

U.S. PATENT DOCUMENTS

| | | | |
|---|---|---|---|
| 3,438,135 | 4/1969 | Bense | 33/600 |
| 3,465,449 | 9/1969 | Wideburg et al. | |
| 4,594,757 | 6/1986 | Johnson, Jr. | |
| 4,790,079 | 12/1988 | Meyers | 33/600 |
| 5,033,292 | 7/1991 | Dennis | |
| 5,513,441 | 5/1996 | Dennis | |
| 5,655,310 | 8/1997 | Lawshea et al. | 33/600 |
| 5,657,545 | 8/1997 | Haworth et al. | 33/600 |

*Primary Examiner*—Christopher W. Fulton
*Attorney, Agent, or Firm*—MacMillan, Sobanski & Todd, LLC

[57] ABSTRACT

An alignment fixture to rotationally align driveshaft components includes a first driveshaft component having a yoke secured to it, the yoke having opposed arms with openings for receiving universal joint bearings, with the openings being aligned on a yoke axis, and wherein a cross with bearing cups is mounted within the yoke, with the bearing cups being positioned within the yoke arm openings, and wherein the first driveshaft component has splines for transmitting torque, and wherein a second driveshaft component has splines for interengagement with the splines of the first driveshaft component in a slip joint, the second driveshaft component having an alignment mark indicative of angular orientation with respect to a universal joint yoke fixed to the second driveshaft component. The fixture includes a main body having a concave surface for positive contact with the first driveshaft component. The fixture also has a pair of opposed locator pads mounted from a forward end of the main body, the opposed locator pads being shaped to contact the bearing cups positioned within the yoke arm openings, the opposed locator pads defining a transverse locator axis therebetween, wherein contact between the opposed locator pads and the bearing cups causes the fixture to become aligned with the yoke of the first driveshaft component resulting in parallel alignment of the transverse locator axis with the yoke axis. The fixture also has an indicator collar on a rearward end of the main body, the indicator collar having indicia indicative of angular displacement of locations on the collar relative to the transverse locator axis, wherein the angular orientation of the second driveshaft component relative to the transverse locator axis, and hence the yoke openings of the first driveshaft component, can be determined by comparing the alignment mark of the second driveshaft component with the indicia on the collar.

19 Claims, 6 Drawing Sheets

ALIGNMENT TOOL FOR PHASING OF SPLINED SLIP JOINT DRIVESHAFT COMPONENTS

TECHNICAL FIELD

This invention relates in general to driveshaft assemblies having at least one universal joint and a splined slip joint connection. More specifically, this invention relates to a fixture for clearly and uniformly identifying the phase angle relationship between the two portions of a slip joint associated with a driveshaft assembly. The term "driveshaft assembly" refers to a torque transmitting member arranged to be any powered by any output source or shaft, and can be used in conjunction with vehicles, such as in a steering shaft or drivetrain component, or can be used in conjunction with numerous other driving applications such as industrial applications.

BACKGROUND OF THE INVENTION

Vehicle drivetrain systems typically include a transmission having an output shaft connected through an elongated drive shaft to an input shaft of an axle assembly. Because of constraints imposed by the overall design of the vehicle, these shafts are rarely aligned such that their axes of rotation are co-axial. To accommodate this, and further to permit a small amount of relative movement to occur between the transmission and the axle assembly resulting from flexing of the vehicle frame during use, universal joints are usually provided in two locations: between the transmission output shaft and the forward end of the driveshaft assembly; and between the rearward end of the driveshaft assembly and the axle assembly input shaft. The universal joints permit the axes of rotation of the adjacent shafts to be angularly aligned, while providing a rotational driving connection between the adjacent shafts.

Generally, the universal joints used in driveshaft assemblies are Cardan type universal joints. A typical Cardan type universal joint includes a pair of yokes which are interconnected by a cross. The cross includes a central body portion having four cylindrical trunnions extending outwardly therefrom. The trunnions are oriented in a single plane and extend at right angles relative to one another. A hollow cylindrical bearing cup having a closed end is mounted on the end of each of the trunnions. A plurality of bearings, such as roller bearings or needle bearings, are provided between the outer cylindrical surface of a given trunnion and the inner cylindrical surface of the associated bearing cup to permit relative rotational movement therebetween. To form a Cardan type universal joint, a first yoke is connected to a first opposed pair of the bearing cups of the cross, while a second yoke is connected to a second opposed pair of the bearing cups. In the context of a driveshaft assembly, therefore, the first universal joint includes a first yoke secured to the end of the transmission output shaft and connected to the bearing cups mounted on the first opposed pair of the trunnions. The bearing cups mounted on the second opposed pair of the trunnions are connected by a second yoke for rotation with the driveshaft assembly. Similarly, the second universal joint of the driveshaft assembly includes a first yoke secured to the end of the second driveshaft member and connected to the bearing cups mounted on the first opposed pair of the trunnions. The bearing cups mounted on the second opposed pair of the trunnions are connected by a second yoke for rotation with the driveshaft assembly.

It is known that whenever a Cardan type universal joint is operated while the rotational axes of the two yokes are not aligned, non-uniform motion is developed. In other words, when one yoke (the driving yoke) is rotated an incremental angular distance, the other yoke (the driven yoke) may not rotate the same incremental angular distance. Rather, the driven yoke rotates either more or less than the incremental angular distance, depending upon the initial angular orientation. Similarly, when the driving yoke is rotated at a constant rotational velocity, the driven yoke does not rotate at the same constant rotational velocity. Rather, the driven yoke rotates either faster or slower than the rotational velocity, again depending upon the initial angular orientation. It has been found that the incremental angular displacement and velocity of the driven yoke vary in a sinusoidal manner relative to the constant angular displacement and velocity of the driven yoke.

The consequence of these sinusoidal variations in angular displacement and velocity in a vehicle driveshaft system is that undesirable torsional vibrations may be generated in the driveshaft assembly. These torsional vibrations can be somewhat annoying to a driver of the vehicle and, therefore, are undesirable. Also, these vibrations can in some cases damage various components of the vehicle. The magnitude of these torsional vibrations is proportional to the square of the operating angle of the universal joint. Where multiple universal joints are connected in series, the effects of universal joints may be combined and expressed as a single equivalent operating angle. Thus, the magnitude of the torsional vibrations in a multiple universal joint system is proportional to the square of the equivalent operating angle of the system.

To a certain extent, the torsional vibrations in a multiple universal joint system can be minimized if the two universal joints connected to the driveshaft assembly are properly oriented relative to one another. This is often referred to as phasing the driveshaft. The relative angular orientation of the yokes which are secured to the two ends of the driveshaft assembly is referred to as the phase angle. For example, let it be assumed that the inboard yokes of the two universal joints are aligned with one another (i.e., the axes of rotation defined by the respective pairs of cross bores formed through the associated yoke arms are parallel). This arrangement is referred to as a zero phase angle between the two universal joints. Further, let it be assumed that the plane defined by the first outboard yoke and the driveshaft is common with the plane defined by the second outboard yoke and the driveshaft. Finally, let it be assumed that the outboard yokes extend at operating angles relative to the driveshaft which are equal and opposite to one another. In this instance, the equivalent operating angle of the system is zero because the torsional vibrations generated by the first universal joint are equal and opposite (i.e., 180° out of phase) to the torsional vibrations generated by the second universal joint. As a result, the torsional vibrations generated by the first universal joint are substantially canceled by the equal and opposite torsional vibrations generated by the second universal joint.

Unfortunately, the design of the vehicle in which the driveshaft assembly is installed dictates the directions in which the outboard yokes extend from the driveshaft assembly. Frequently, the outboard yokes do not extend in a common plane or at angles which are equal and opposite to one another. On the contrary, it is common not only that the two outboard yokes extend in different planes, but also that they extend at different operating angles. To accommodate this structure, while still providing some mutual cancellation of the undesired torsional vibrations, it is known to orient the two inboard yokes of the two universal joints at a non-zero phase angle (i.e., the axes defined by the respective pairs of cross bores are not parallel). This angular misalignment provides, in many instances, sufficient mutual cancellation of the sinusoidal variations to eliminate or otherwise reduce the annoying and/or problematic torsional vibrations during normal use.

To provide additional pliability for vehicle driveshaft assemblies to accommodate the flexing of the vehicle frame during operation of the vehicle, vehicle driveshaft assemblies are frequently provided with splined slip joint connections, which are cooperating male and female splined telescoping driveshaft members. The yoke shaft component of the driveshaft assembly is provided with external splines and the spline sleeve component of the driveshaft assembly is hollow with internal splines. The interengagement of the external and internal splines provides a positive rotational connection for the transmission of torque through the driveshaft. At the same time, the slip joint connection enables the yoke spline sleeve driveshaft assembly components to move axially with respect to each other to reconcile distance variations between the transmission and the axle assembly occurring during normal flexing of the vehicle frame.

One of the problems encountered during the manufacture and assembly of slip joint driveshafts is that it is difficult to accurately fix or establish the desired phase alignment between the yoke shaft and the spline sleeve driveshaft components. Care must be taken to assure that the external and internal splines of the yoke shaft and spline sleeve, respectively, are interengaged in the desired phase alignment, as specified by the manufacturer. In a typical driveshaft slip joint spline configuration anywhere from about 3 to about 75 splines are used on the yoke shaft, with an equal number of splines on the spline sleeve. Therefore, each phase angle rotation from one spline to the next results an a variation of anywhere from about 4.8 to about 120 degrees between the axes of the two end yokes.

While great pains are usually taken to properly phase align the driveshaft yoke shaft with the driveshaft spline sleeve, improperly aligned driveshafts are still inadvertently produced, requiring reassembly at additional labor expense. Typically, the insertion of the yoke shaft into the spline sleeve is carried out during a "blind" assembly procedure in which the operator cannot physically see the alignment of the splines. Further, after assembly, each driveshaft must be checked as to whether or not the phase angle between the yoke shaft and the spline sleeve has been properly set. It would be advantageous if a method and apparatus could be devised to facilitate accurate alignment of the yoke shaft and spline sleeve driveshaft components. Such an improved method and apparatus should not only increase the accuracy of the phase alignment of the two driveshaft components, but should also speed up the alignment process.

Another problem which has been encountered in the design and manufacture of vehicle driveshafts is that it is sometimes difficult to interpret what the desired phase angle relationship is from drawings that have been generated to illustrate the structure of the driveshaft assembly. In some instances, the standards used by a vehicle manufacturer may be different from the standards used by the supplier of the driveshaft. In other instances, the standards used by the designer of the driveshaft assembly may be different from the manufacturer of the driveshaft. Because of these difficulties, it would be desirable to provide a fixture which clearly and unambiguously identifies the phase angle relationships between the universal joints secured to the ends of a driveshaft.

SUMMARY OF THE INVENTION

The above object as well as other objects not specifically enumerated are achieved by an alignment fixture for rotationally aligning driveshaft components. The driveshaft assembly includes a first driveshaft component having a yoke secured to it, the yoke having opposed arms with openings for receiving universal joint bearings, with the openings being aligned on a yoke axis, and wherein a cross with bearing cups is mounted within the yoke, with the bearing cups being positioned within the yoke arm openings, and wherein the first driveshaft component has splines for transmitting torque, and wherein a second driveshaft component has splines for interengagement with the splines of the first driveshaft component in a slip joint, the second driveshaft component having an alignment mark indicative of angular orientation with respect to a universal joint yoke fixed to the second driveshaft component. The fixture includes a main body having a concave surface for positive contact with the first driveshaft component. The fixture also has a pair of opposed locator pads mounted from a forward end of the main body, the opposed locator pads being shaped to contact the bearing cups positioned within the yoke arm openings, the opposed locator pads defining a transverse locator axis therebetween, wherein contact between the opposed locator pads and the bearing cups causes the fixture to become aligned with the yoke of the first driveshaft component resulting in parallel alignment of the transverse locator axis with the yoke axis. The fixture also has an indicator collar on a rearward end of the main body, the indicator collar having indicia indicative of angular displacement of locations on the collar relative to the transverse locator axis, wherein the angular orientation of the second driveshaft component relative to the transverse locator axis, and hence the yoke openings of the first driveshaft component, can be determined by comparing the alignment mark of the second driveshaft component with the indicia on the collar.

Various objects and advantages of this invention will become apparent to those skilled in the art from the following detailed description of the preferred embodiment, when read in light of the accompanying drawings.

DETAILED DESCRIPTION OF THE INVENTION

Figure 1:
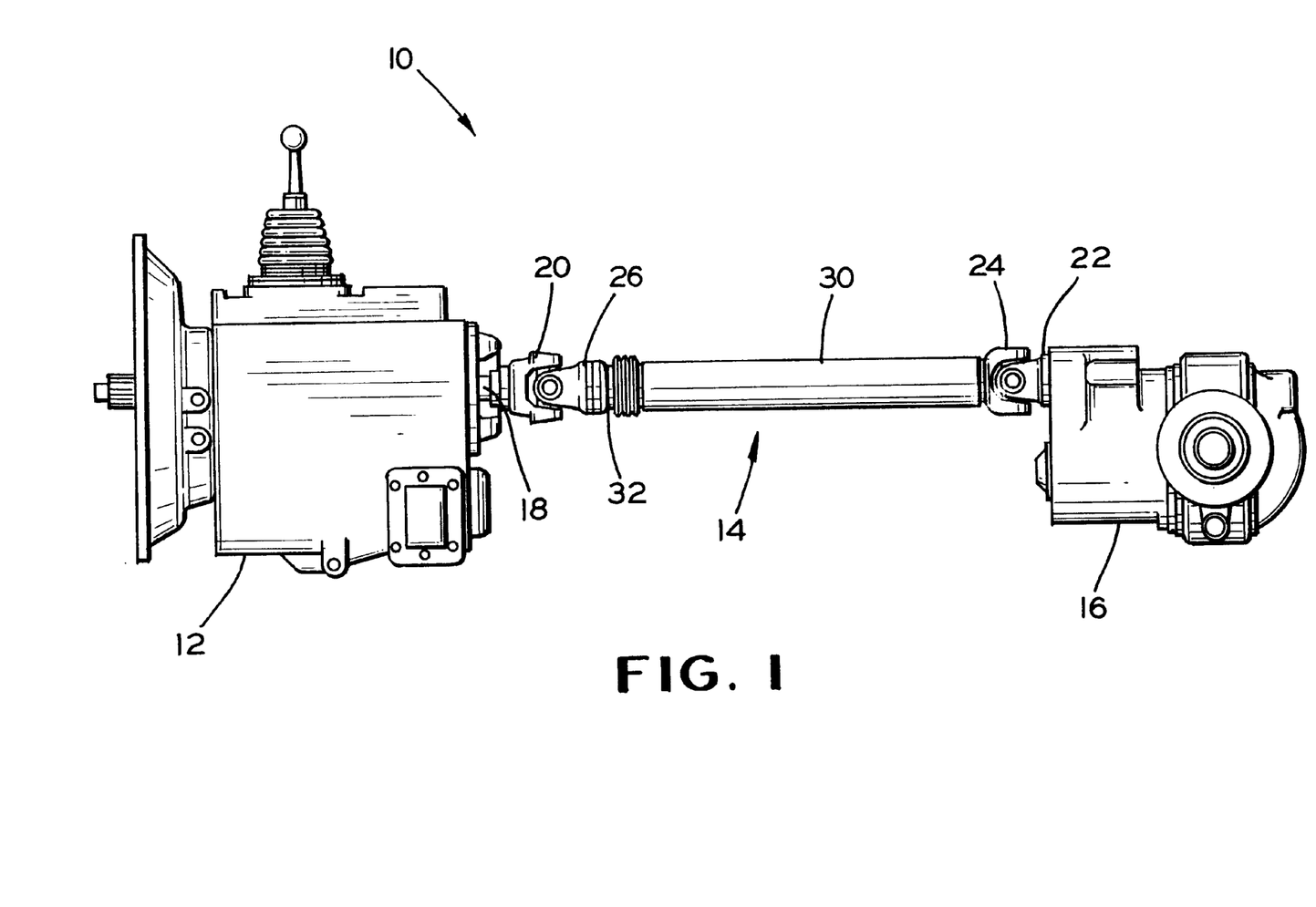
FIG. 1 is a schematic view in elevation of a vehicle drivetrain assembled using the alignment fixture of the invention.

As shown in FIG. 1, the drive train, indicated generally at 10, includes a transmission 12, a driveshaft assembly indicated generally at 14, and an axle assembly 16. The driveshaft assembly 14 is connected to the transmission output shaft 18 by a forward universal joint 20 in conjunction with a companion flange or end yoke, and the driveshaft assembly 14 is connected to the axle assembly input shaft 22 by a rearward universal joint 24 in conjunction with a companion flange or end yoke. The universal joints 20 and 24 provide torque transmission from the transmission 12 to the axle assembly 16, even where the transmission output shaft 18 and the axle assembly input shaft 22 are not axially aligned.

The driveshaft assembly 14 is comprised of a first or forward driveshaft component 26, and a second or rearward driveshaft component 30, joined together by a slip joint 32. The rearward driveshaft component 30 is designed to telescope within the forward driveshaft component 26 to form the slip joint 32. The slip joint enables the driveshaft assembly 14 to change its overall length to accommodate the flexing of the vehicle frame during the operation of the vehicle.

Figure 2:
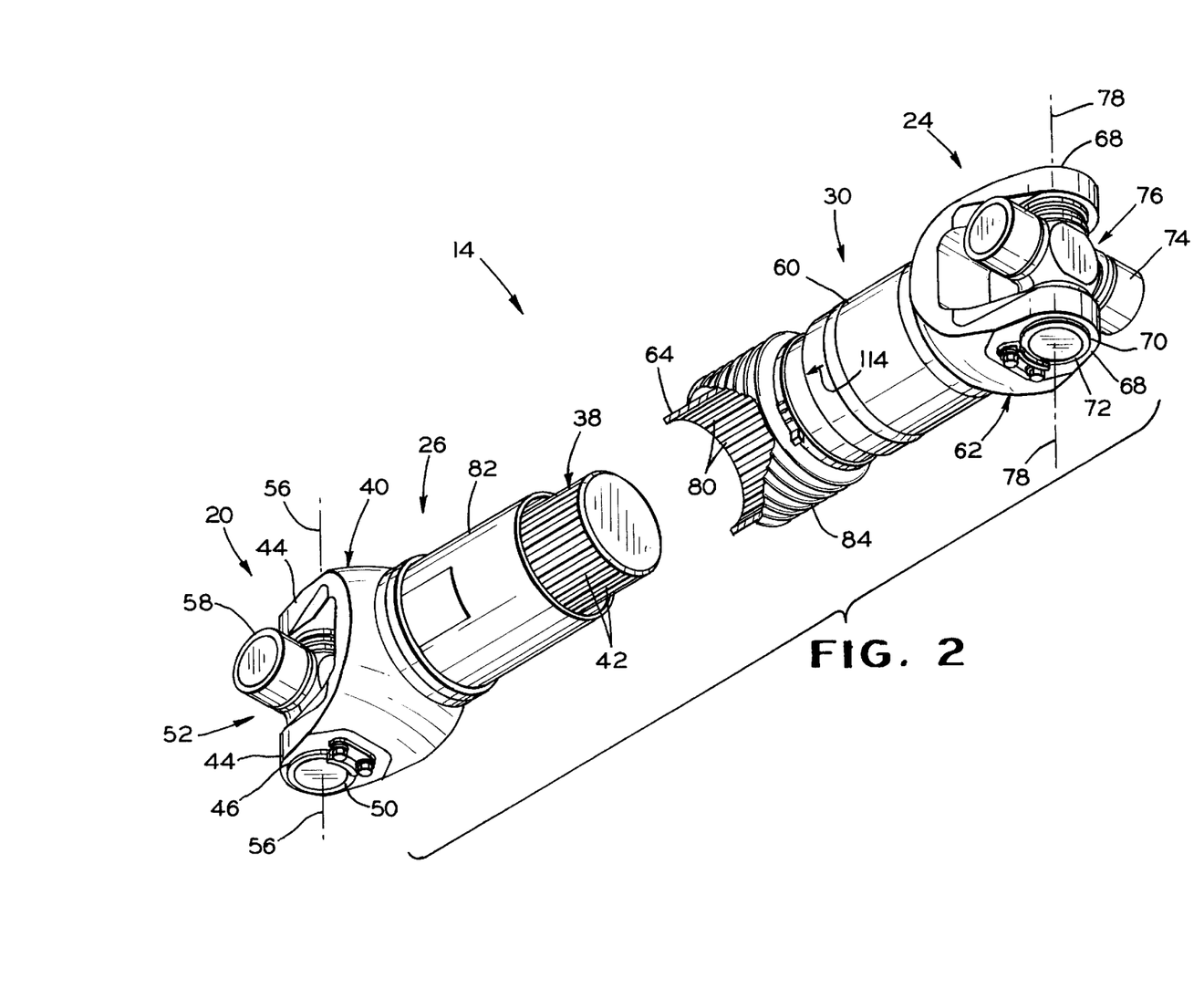
FIG. 2. is an exploded view of the driveshaft assembly of FIG. 1.

As shown in FIG. 2, the forward driveshaft component 26 is a yoke shaft assembly, and includes a yoke shaft 38 and a forward yoke 40. The yoke shaft 38 has a plurality of splines 42 for transmitting torque to a similarly splined member, as will be explained below. The yoke 40 includes a pair of ears or lugs 44. Openings 46 in the lugs 44 are adapted to receive the bearing cups 50 of the universal joint cross 52. The lugs 44 are generally flat and parallel to each other, and the openings 46 are generally cylindrical openings aligned on forward lug opening axis 56.

The cross 52 has four radially projecting trunnions 58 on which the bearing cups 50 are mounted. The bearing cups enable the trunnions to rotate during operation of the universal joint. Two of the bearing cups 50 will be mounted in the openings 46 of the forward yoke 40, and two of the bearing cups will be mounted in a transmission tube yoke, not shown in FIG. 2, associated with the transmission output shaft 18. The cross 52, the forward yoke 40, and the transmission yoke together constitute the forward universal joint 20.

The rearward driveshaft component 30 is comprised of tube 60, rearward tube yoke 62, and spline sleeve 64. The rearward tube yoke 62 is similar to the forward yoke 40, and includes a pair of ears or lugs 68. Openings 70 in the lugs 68 are adapted to receive the bearing cups 72 mounted on the trunnions 74 of the universal joint cross 76. The lugs 68 are generally flat and parallel to each other, and the openings 70 are generally cylindrical openings aligned on rearward lug opening axis 78. The rear cross 76, the rearward tube yoke 62, and a yoke associated with the axle assembly, not shown in FIG. 2, all constitute the rear universal joint 24.

The spline sleeve 64 is partially cut away to reveal the internal splines 80 in the interior of the rearward driveshaft component 30. The internal splines 80 correspond with and interengage the external splines 42 on the yoke shaft 38 for a positive torque relationship. The yoke shaft assembly 26 also includes a protective cylindrical shield or can 82 mounted concentrically about the yoke shaft 38, and spaced from the yoke shaft, to protect the slip joint from contamination after assembly. When the rearward driveshaft component 30 is brought together with the forward driveshaft component 26 to form the driveshaft assembly 14, the spline sleeve 64 fits concentrically within the annular space between the can 82 and the splined yoke shaft 38.

A further feature of the driveshaft assembly 14 is the presence of a boot 84 which, after assembly of the driveshaft assembly, completely covers the slip joint 32 to protect the slip joint from external elements. Protective boots are well known in the art. The boot 84 is shown in FIG. 2 as being positioned on the spline sleeve 64. The boot 84 is not shown in FIG. 1 so that the slip joint 32 can be seen. All of the above-described driveshaft assembly apparatus is generally conventional and well known to those skilled in the art.

Figure 3:
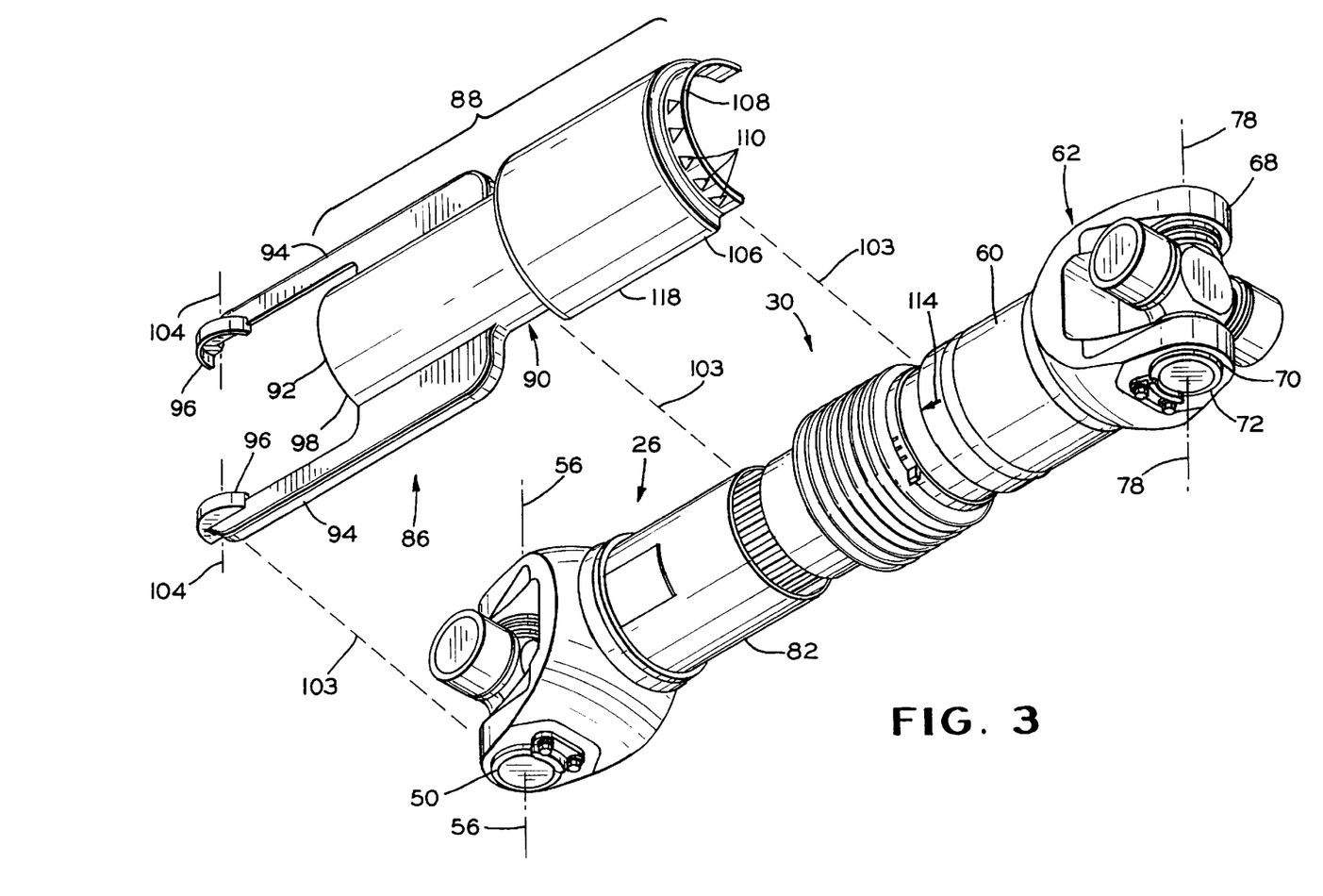
FIG. 3 is an exploded view of the two driveshaft components of FIG. 2 along with the alignment fixture of the invention.
Figure 4:
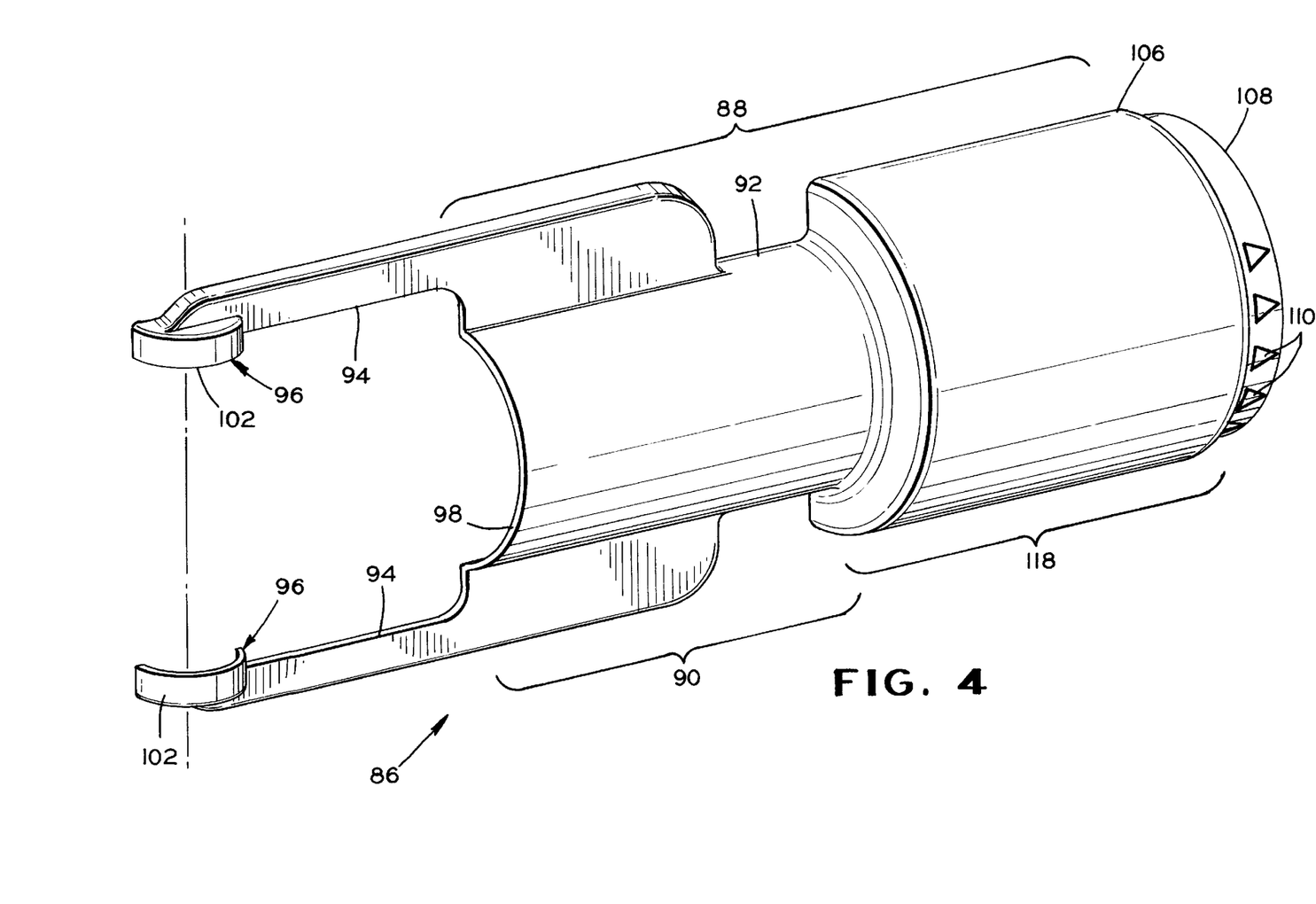
FIG. 4 is a perspective view of the exterior of the alignment fixture of the invention.
Figure 5:
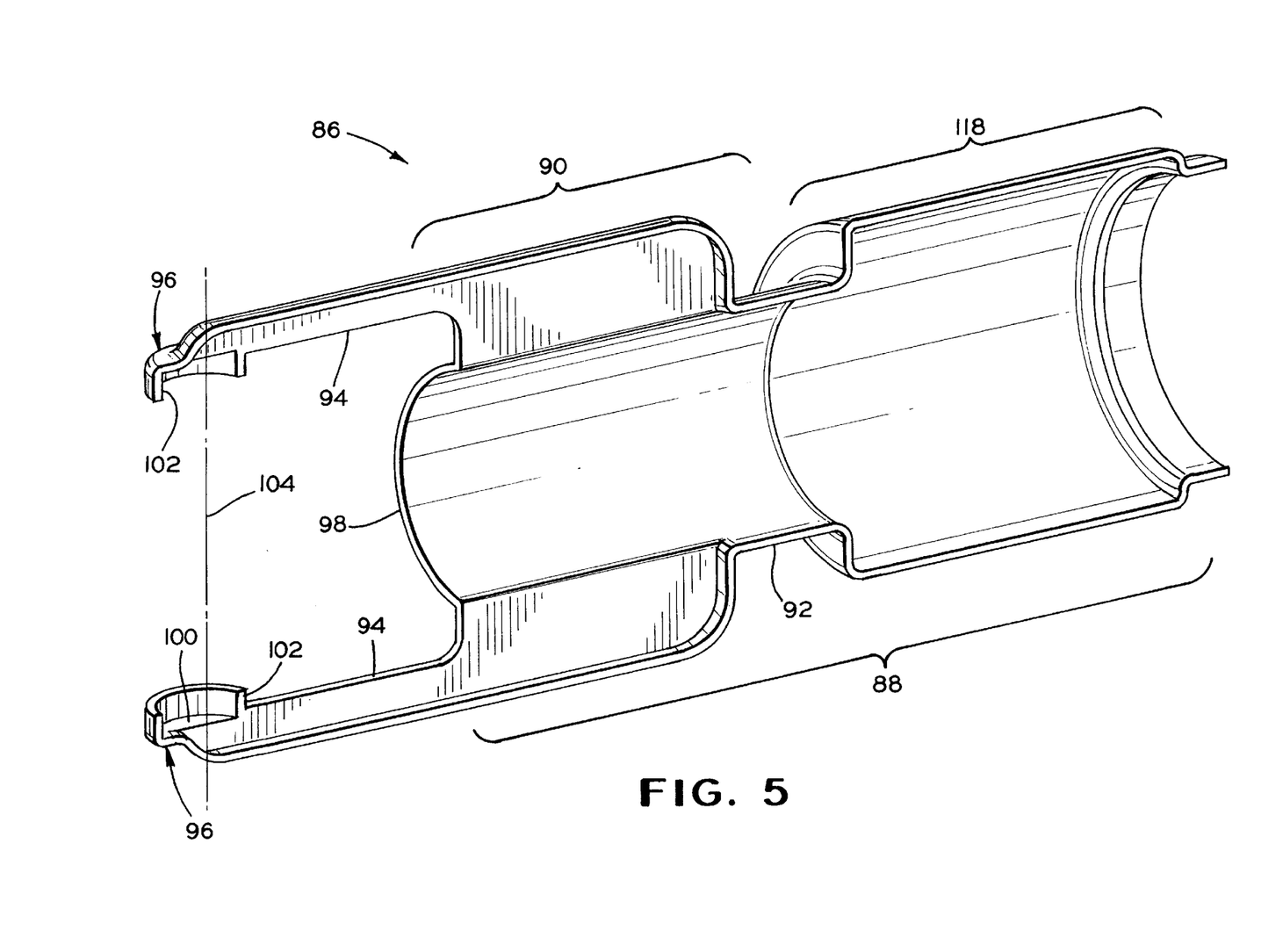
FIG. 5 is a perspective view of the interior of the alignment fixture of the invention.

As shown in FIGS. 3–5, the alignment fixture 86 of the invention is generally comprised of a main body 88, and has a curved tube contact portion 90 which is contoured to intimately contact the can 82 attached to the forward driveshaft component 26. The fixture 86 can be made of any rigid material, such as a molded plastic material. The contact portion 90 can have any shape suitable for positive contact with the driveshaft tubing so that the fixture will be positively positioned with respect to the first driveshaft component 26. Preferably, the contact portion has a generally semicylindrical concave surface 92. Typical truck driveshafts have diameters of roughly 96 to about 114 mm, and ideally the contact portion 90 should have a curved surface 92 which approximates the diameter of the can 82.

Extending from the main body 88 are a pair of opposed fixture arms 94, at the end of which are opposed locator pads 96. The fixture arms 94 extend forwardly from the forward end 98 of the main body 88, and the locator pads 96 are indirectly mounted from the main body 88 by the arms 94. The arms 94 can be any members for mounting the locator pads from the main body 88, while still positioning the locator pads 96 in the proper position in contact with the bearing cups 50. The locator pads 96 are shaped to contact the bearing cups 50 positioned within the lug arms 44 of the yoke 40. The locator pads can be any shape suitable for positive, secure contact with the forward tube yoke 40. The locator pads 96 are preferably comprised of relatively flat contact surfaces 100 and a curvilinear rim 102 so that they can make positive contact with the bearing cups. As shown in FIG. 5, the contact surfaces 100 are semicircular and the rim 102 extends along the curved portion of the contact surfaces 100. The contact surfaces 100 need not necessarily be semicircular, but must be a bearing cup-conforming surface for intimate contact with and positive location with respect to the bearing cups so that the fixture becomes aligned with the forward yoke 40 of the first driveshaft component 26. Preferably, the locator pads 96 and the main body 88 are both concave and oriented with their open or concave sides in the same direction so that the fixture can be easily placed into contact with the first driveshaft component.

The locator pads 96 are spaced apart and are in an opposed alignment. A line extending between the two spaced apart locators is the transverse locator axis 104, which is generally perpendicular to the contact surfaces 100. When the alignment fixture is to be used, the fixture is moved into contact with the first and second driveshaft components, as indicated by dashed lines 103. As can be seen in FIG. 3, when the alignment fixture 86 is positioned properly on the first driveshaft component 26 and the locator pads 96 are in contact with the bearing cups 50, the transverse locator axis 104 is substantially parallel to the axis 56 of the lug openings 46 and bearing caps 50. Preferably these two axes are not only parallel, but are collinear. By aligning the transverse locator axis 104 with the axis 56 of the lug openings, the alignment fixture 86 is positively fixed with respect to the rotational or phase alignment of the first driveshaft component 26.

Positioned at the rearward end 106 of the main body 88 is an indicator collar 108 which has indicia 110 indicative of angular displacement of locations on the collar 108 relative to the transverse locator axis 104, and hence the axis 56 and the yoke openings 46. An alignment mark 114 on the tube 60 of the rearward driveshaft component 30 is fixed with respect to the rearward tube yoke 62, and in particular, with respect to the axis 78 of the rear yoke openings 70. During assembly of the slip joint 32 the indicator mark 114 is lined up with a specified one of the indicia marks 110 on the indicator collar 108. In this manner the angular orientation of the second or rearward driveshaft component 30 relative to the transverse locator axis 104, and hence the yoke openings 46 of the first driveshaft component 26, can be determined by comparing the alignment mark 114 of the second driveshaft component 30 with the indicia 110 on the collar 108. Although the alignment mark 14 is shown on the tube 60, the alignment mark can be placed on the rearward tube yoke 62 as well.

The indicia 110 can be marked in increments indicating a specified number of degrees of rotation corresponding to the number of degrees from one spline 82 to the next. For example, with 34 splines, each spline would be separated about 10½ degrees from the next spline, and therefore the indicia 110 would be spaced apart about 10½ degrees.

As discussed above, and as shown in FIG. 2, the first driveshaft component 26 is provided with a boot 84 protect the slip joint 32 from the elements. Since the boot is typically of a greater diameter than the can 82, the alignment fixture 86 must be constructed to accommodate this larger diameter. Accordingly, the main body 88 of the alignment fixture 86 has a semicylindrical, concave spacer portion 118 positioned rearward of the contact portion 90. The diameter of the spacer portion 118 is larger than the diameter of the contact portion 90 to accommodate the boot 84.

Figure 6:
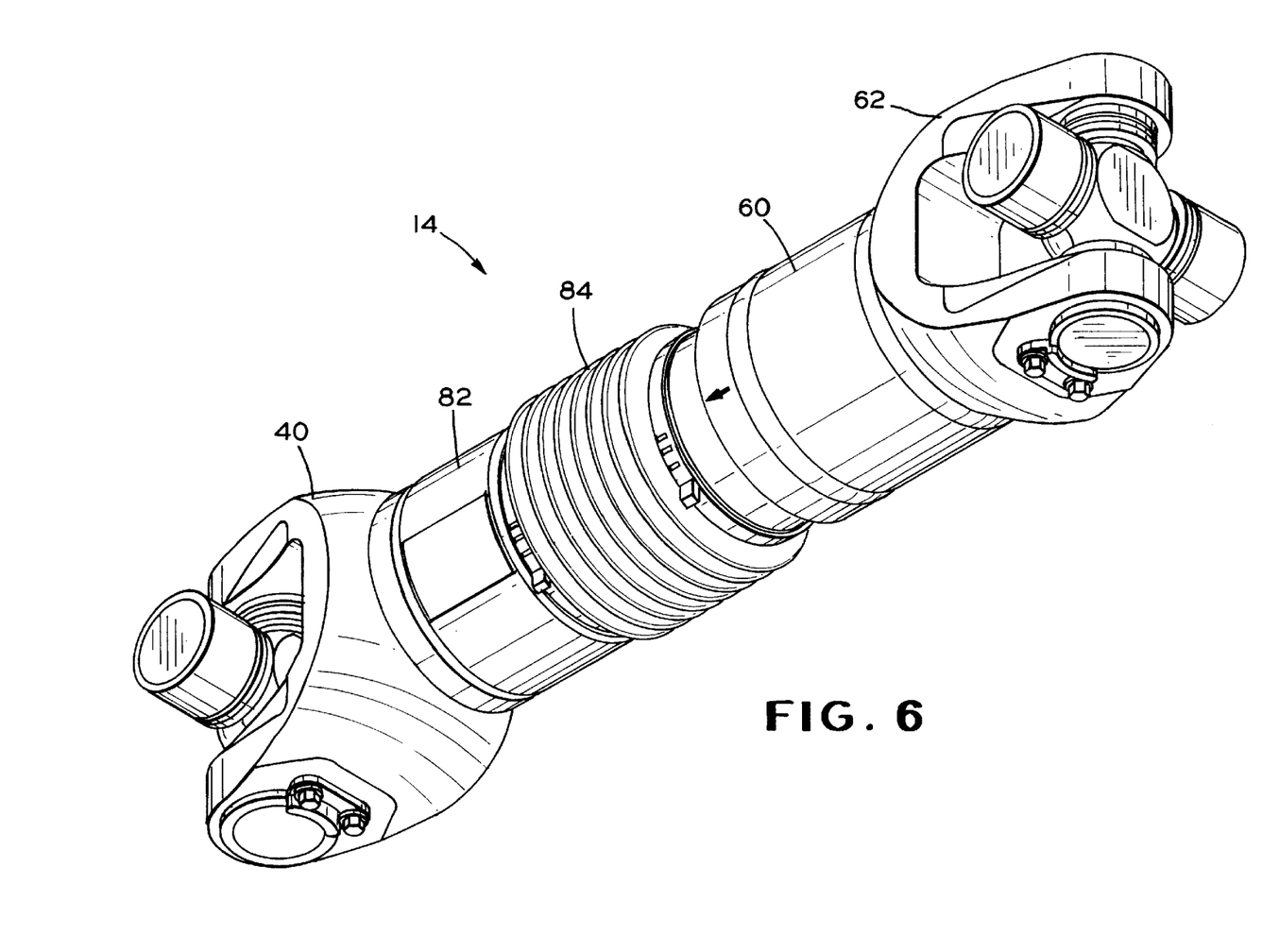
FIG. 6 is a perspective view of the completed driveshaft assembly.

In operation, the first step in forming a correctly aligned slip joint is to place the alignment fixture 86 firmly in contact with the can 82 attached to the first or forward driveshaft component 26. The locator pads 96 are then in contact with the bearing cups 50. The rearward driveshaft component 30 is then rotated so that the indicator mark 114 on the rearward driveshaft component 30 is aligned with the appropriate indicia 110 on the indicator collar 108, thereby providing proper phase alignment. The rearward driveshaft component 30 is moved axially into inter-spline engagement with the forward driveshaft component 26 to form a properly rotationally aligned or phase aligned driveshaft assembly 14, as shown in FIG. 6.

While the alignment fixture 86 of the invention is shown as being rigid and of fixed length, it is to be understood that in an alternate embodiment of the invention, not shown, the arms of the fixture can have an adjustable length to enable the alignment fixture to accommodate forward driveshaft components of different lengths. Also, in another alternate embodiment of the invention, not shown, the main body of the fixture can have an adjustable length to accommodate driveshaft components of different lengths.

Although the invention has been described using as an example a driveshaft assembly 14 comprised of a yoke shaft assembly 26 and a spline sleeve assembly 30, it is to be understood that the invention could also be used for a driveshaft assembly comprised of a tube shaft and a slip yoke.

The principle and mode of operation of this invention have been described in its preferred embodiment. However, it should be noted that this invention may be practiced otherwise than as specifically illustrated and described without departing from its scope.

What is claimed is:

1. An alignment fixture to rotationally align driveshaft components wherein a first driveshaft component has a yoke secured to it, the yoke having opposed arms with openings for receiving universal joint bearings, with the openings being aligned on a yoke axis, and wherein a cross with bearing cups is mounted within the yoke, with the bearing cups being positioned within the yoke arm openings, and wherein the first driveshaft component has splines for transmitting torque, and wherein a second driveshaft component has splines for interengagement with the splines of the first driveshaft component in a slip joint, the second driveshaft component having an alignment mark indicative of angular orientation with respect to a universal joint yoke fixed to the second driveshaft component, the fixture comprising:

a main body having a concave surface for positive contact with the first driveshaft component;

a pair of opposed locator pads mounted from a forward end of the main body, the opposed locator pads being shaped to contact the bearing cups positioned within the yoke arm openings, the opposed locator pads defining a transverse locator axis therebetween, wherein contact between the opposed locator pads and the bearing cups causes the fixture to become aligned with the yoke of the first driveshaft component resulting in parallel alignment of the transverse locator axis with the yoke axis; and     an indicator collar on a rearward end of the main body, the indicator collar having indicia indicative of angular displacement of locations on the collar relative to the transverse locator axis, wherein the angular orientation of the second driveshaft component relative to the transverse locator axis, and hence the yoke openings of the first driveshaft component, can be determined by comparing the alignment mark of the second driveshaft component with the indicia on the collar.

2. The fixture of claim 1 where the indicia on the indicator collar are visible indicia.

3. The fixture of claim 1 where a pair of opposed arms extend axially forward from the forward end of the main body, the opposed arms mounting the opposed locator pads from the main body.

4. The fixture of claim 1 where a first driveshaft component is a splined yoke shaft assembly, and the second driveshaft component includes a spline sleeve.

5. The fixture of claim 1 where the opposed locator pads are comprised of generally flat contact surfaces and a curvilinear rim.

6. The fixture of claim 5 in which the contact surfaces are semicircular, and the curvilinear rims extend along the curved portion of the semicircular contact surfaces.

7. The fixture of claim 6 in which the concave surface of the main body and the curvilinear rim of the locator pads are both oriented in the same direction so that the fixture can be easily placed into contact with the first driveshaft component.

8. The fixture of claim 7 wherein the main body has a generally semicylindrical contact portion for contact with the first driveshaft component, and has a generally semicylindrical spacer portion rearward of the contact portion to accommodate a boot positioned on the first driveshaft component, with the spacer portion having a diameter larger than the diameter of the contact portion.

9. The fixture of claim 1 wherein the fixture is a molded plastic material.

10. An alignment fixture to rotationally align driveshaft components wherein a first driveshaft component has a yoke secured to it, the yoke having opposed arms with openings for receiving universal joint bearings, with the openings being aligned on a yoke axis, and wherein a cross with bearing cups is mounted within the yoke, with the bearing cups being positioned within the yoke arm openings, and wherein the first driveshaft component has splines for transmitting torque, and wherein a second driveshaft component has splines for interengagement with the splines of the first driveshaft component in a slip joint, the second driveshaft component having an alignment mark indicative of angular orientation with respect to a universal joint yoke fixed to the second driveshaft component, the fixture comprising:

a main body having a generally semicylindrical contact portion for contact with the first driveshaft component;

a pair of opposed locator pads mounted from a forward end of the main body, the opposed locator pads being shaped to contact the bearing cups positioned within the yoke arm openings, the opposed locator pads defining a transverse locator axis therebetween, wherein contact between the opposed locator pads and the bearing cups causes the fixture to become aligned with the yoke of the first driveshaft component resulting in parallel alignment of the transverse locator axis with the yoke axis; and an indicator collar on a rearward end of the main body, the indicator collar having visible indicia indicative of angular displacement of locations on the collar relative to the transverse locator axis, wherein the angular orientation of the second driveshaft component relative to the transverse locator axis, and hence the yoke openings of the first driveshaft component, can be determined by comparing the alignment mark of the second driveshaft component with the indicia on the collar.

11. The fixture of claim 10 where a pair of opposed arms extend axially forward from the forward end of the main body, the opposed arms mounting the opposed locator pads from the main body.

12. The fixture of claim 10 where a first driveshaft component is a splined yoke shaft assembly, and the second driveshaft component includes a spline sleeve.

13. The fixture of claim 10 where the opposed locator pads are comprised of generally flat contact surfaces and a curvilinear rim.

14. The fixture of claim 13 in which the contact surfaces are semicircular, and the curvilinear rims extend along the curved portion of the semicircular contact surfaces.

15. The fixture of claim 14 in which the concave surface of the main body and the curvilinear rim of the locator pads are both oriented in the same direction so that the fixture can be easily placed into contact with the first driveshaft component.

16. The fixture of claim 15 wherein the main body has a generally semicylindrical spacer portion rearward of the contact portion to accommodate a boot positioned on the first driveshaft component, with the spacer portion having a diameter larger than the diameter of the contact portion.

17. The fixture of claim 16 wherein the fixture is a molded plastic material.

18. The fixture of claim 10 wherein the main body has a generally semicylindrical spacer portion rearward of the contact portion to accommodate a boot positioned on the first driveshaft component, with the spacer portion having a diameter larger than the diameter of the contact portion.

19. The fixture of claim 18 wherein the fixture is a molded plastic material.

* * * * *